(12) United States Patent
Du et al.

(10) Patent No.: US 9,939,889 B2
(45) Date of Patent: Apr. 10, 2018

(54) INTERACTION METHODS AND SYSTEMS

(71) Applicant: Beijing Zhigu Rui Tuo Tech Co., Ltd, Beijing (CN)

(72) Inventors: Lin Du, Beijing (CN); Lei Pan, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 9 days.

(21) Appl. No.: 15/304,512

(22) PCT Filed: Mar. 12, 2015

(86) PCT No.: PCT/CN2015/074060
§ 371 (c)(1),
(2) Date: Oct. 15, 2016

(87) PCT Pub. No.: WO2015/158188
PCT Pub. Date: Oct. 22, 2015

(65) Prior Publication Data
US 2017/0038832 A1    Feb. 9, 2017

(30) Foreign Application Priority Data
Apr. 16, 2014 (CN) .......................... 2014 1 0153167

(51) Int. Cl.
*H04B 5/00*    (2006.01)
*G06F 3/01*    (2006.01)
(Continued)

(52) U.S. Cl.
CPC .............. *G06F 3/011* (2013.01); *G01S 15/04* (2013.01); *G06F 1/163* (2013.01)

(58) Field of Classification Search
None
See application file for complete search history.

(56) References Cited

U.S. PATENT DOCUMENTS

| 5,724,313 A | 3/1998 | Burgess et al. |
| 6,504,794 B2 * | 1/2003 | Haase .................. G01S 3/8034 367/119 |

(Continued)

FOREIGN PATENT DOCUMENTS

| CN | 101910865 A | 12/2010 |
| CN | 102573649 A | 7/2012 |

(Continued)

OTHER PUBLICATIONS

International Search Report for PCT Application No. PCT/CN2015/074060, dated Jun. 16, 2015, 4 pages.

*Primary Examiner* — Tuan A Tran
(74) *Attorney, Agent, or Firm* — Amin, Turocy & Watson, LLP

(57) ABSTRACT

The present application provides an interaction method and system, and relates to the field of information interaction. The method comprises: sending a first wave signal; receiving a second wave signal that corresponds to the first wave signal after the first wave signal is transmitted by using a medium comprising at least a part of a user body; and judging whether the user body contacts an object according to a signal characteristic of the received second wave signal. The interaction method and system can help a user to naturally and efficiently complete an information interaction process, simplify an interaction process, and improve the interaction efficiency.

27 Claims, 5 Drawing Sheets

(51) Int. Cl.
*G06F 1/16* (2006.01)
*G01S 15/04* (2006.01)

(56) References Cited

U.S. PATENT DOCUMENTS

| | | | |
|---|---|---|---|
| 6,569,160 B1 | 5/2003 | Goldin et al. | |
| 8,665,210 B2 | 3/2014 | Tan et al. | |
| 9,220,477 B2 | 12/2015 | Urabe et al. | |
| 9,317,835 B2* | 4/2016 | Calman | G06Q 10/10 |
| 2003/0036696 A1 | 2/2003 | Willis et al. | |
| 2004/0267133 A1 | 12/2004 | Podany | |
| 2009/0298447 A1* | 12/2009 | Kim | H04B 13/005 |
| | | | 455/127.1 |
| 2010/0045446 A1* | 2/2010 | Hyun | H04B 13/005 |
| | | | 340/10.51 |
| 2010/0278008 A1 | 11/2010 | Ammar | |
| 2011/0182447 A1* | 7/2011 | Kim | H04R 27/00 |
| | | | 381/151 |
| 2011/0282623 A1 | 11/2011 | Schneider et al. | |
| 2012/0026129 A1* | 2/2012 | Kawakami | G06F 1/1643 |
| | | | 345/174 |
| 2012/0146892 A1 | 6/2012 | Hamada et al. | |
| 2012/0162057 A1 | 6/2012 | Du | |
| 2013/0093616 A1* | 4/2013 | Jeon | G01S 7/412 |
| | | | 342/118 |
| 2014/0343392 A1 | 11/2014 | Yang | |

FOREIGN PATENT DOCUMENTS

| | | | | |
|---|---|---|---|---|
| CN | 102854978 A | | 1/2013 | |
| CN | 103605423 A | | 2/2014 | |
| CN | 103760970 A | | 4/2014 | |
| CN | 103927009 A | | 7/2014 | |
| CN | 103941867 A | | 7/2014 | |
| JP | 2006292634 | * | 10/2006 | G01S 15/10 |
| WO | 2011123833 A1 | | 10/2011 | |
| WO | 2013075270 A1 | | 5/2013 | |
| WO | 2015154602 A1 | | 10/2015 | |

* cited by examiner

INTERACTION METHODS AND SYSTEMS

RELATED APPLICATION

The present application is a U.S. National Stage filing under 35 U.S.C. § 371 of international patent cooperation treaty (PCT) application No. PCT/CN2015/074060, filed Mar. 12, 2015, and entitled "INTERACTION METHODS AND SYSTEMS", which claims the benefit of priority to Chinese Patent Application No. 201410153167.1, filed on Apr. 16, 2014, which applications are hereby incorporated into the present application by reference herein in their respective entireties.

TECHNICAL FIELD

The present application relates to the field of information interaction technologies, and in particular, to interaction methods and systems.

BACKGROUND

With the development of electronic devices, wearable devices are proposed by people, and are gradually being accepted by people. Wearable devices such as smart glasses, smart watches, and smart rings bring about great convenience for people's daily life.

Wearable devices usually have characteristics, such as catering for users, compactness, portability, and low power consumption; however, because of these characteristics, wearable devices usually have a poor interaction capability.

SUMMARY

An example non-limiting objective of the present application is to provide natural and efficient interaction methods and systems.

According to a first example aspect of at least one embodiment of the present application, an interaction method is provided, wherein the method comprises:
  sending a first wave signal;
  receiving a second wave signal that corresponds to the first wave signal after the first wave signal is transmitted by using a medium comprising at least a part of a user body; and
  judging whether the user body contacts an object according to a signal characteristic of the received second wave signal.

According to another example aspect of at least one embodiment of the present application, an interaction system is provided, wherein the system comprises:
  a sending apparatus, configured to send a first wave signal;
  a receiving apparatus, configured to receive a second wave signal that corresponds to the first wave signal after the first wave signal is transmitted by using a medium comprising at least a part of a user body; and
  a judging apparatus, configured to judge whether the user body contacts an object according to a signal characteristic of the received second wave signal.

The various interaction methods and systems according to at least one embodiment of the present application can help a user to naturally and efficiently complete an information interaction process, simplify an interaction process, and/or improve the interaction efficiency.

DETAILED DESCRIPTION

Various embodiments of the present application are further described in detail with reference to accompanying drawings and embodiments. The following embodiments are used to describe the present application, but are not intended to limit the scope of the present application.

A person skilled in the art understands that sequence numbers of the following steps do not mean execution sequences in embodiments of the present application. The execution sequences of the steps should be determined according to functions and internal logic of the steps, and should not be construed as any limitation on the embodiments of the present application.

Besides, terminologies such as "first" and "second" in the embodiments of the present application are used to distinguish different steps, devices, modules, or the like, and represent neither specific technical definition nor mandatory logical sequence of "first" and "second".

In embodiments of the present application, a wave signal is a signal transmitted in a form of a wave. An electromagnetic wave signal, an acoustic wave signal, or the like may be used as at least one of a first wave signal and a second wave signal. The inventor also finds in researches that an ultrasonic wave is an acoustic wave with frequency higher than 20000 Hz; the ultrasonic wave has desirable directivity and a strong penetration capability, and therefore relatively concentrated sound energy is easily obtained. The ultrasonic wave has a long transmission distance in water, and around 65% of constituents of a human body are water; therefore, ultrasonic wave information is desirably transmitted by using a human body as a transmission medium. Besides, frequency of the ultrasonic wave is beyond the human hearing range; therefore, a user cannot perceive the existence of an ultrasonic wave signal, and consequently the user is not affected by noise. In addition, the inventor also finds that an electromagnetic wave with frequency lower than 100 MHz is also desirably transmitted by using a human body as a transmission medium, and is applicable to the embodiments of the present application.

Figure 1A:
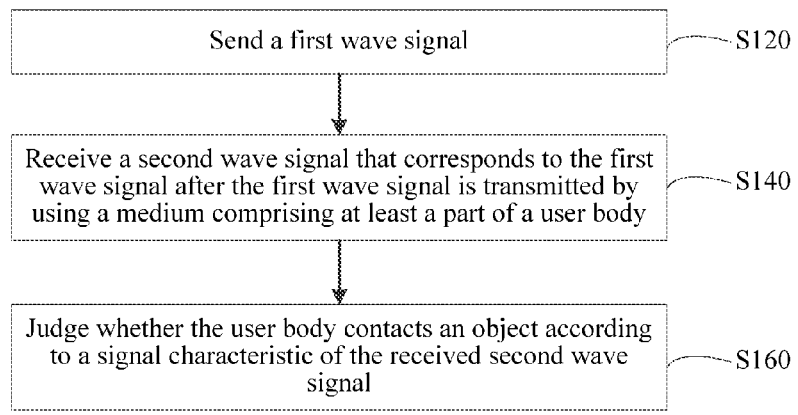
FIG. 1a is an example flowchart of an interaction method according to an embodiment of the present application.

FIG. 1a is a flowchart of an interaction method according to an embodiment of the present application, wherein the interaction method may be implemented in, for example, an interaction system. As shown in FIG. 1a, the method comprises:

S120: Send a first wave signal.

S140: Receive a second wave signal that corresponds to the first wave signal after the first wave signal is transmitted by using a medium comprising at least a part of a user body.

S160: Judge whether the user body contacts an object according to a signal characteristic of the received second wave signal.

In the method according to this embodiment of the present application, the first wave signal is sent; the second wave signal that corresponds to the first wave signal after the first wave signal is transmitted by using the medium comprising at least a part of the user body is received, wherein depending on whether the user body contacts an object, a signal characteristic of the second wave signal is different; and consequently whether the user body contacts the object can be naturally and efficiently determined according to the signal characteristic of the received second wave signal.

Functions of step S120, step S140, and step S160 are described in detail below.

S120: Send a first wave signal.

In an example embodiment, the first wave signal may be periodically sent, for example, the first wave signal is sent each second.

In another example embodiment, the first wave signal may be sent as triggered by a user, for example, the first wave signal is sent in response to pressing, by the user, a key.

S140: Receive a second wave signal that corresponds to the first wave signal after the first wave signal is transmitted by using a medium comprising at least a part of a user body.

The second wave signal may be formed after the first wave signal is reflected. In the case in which the user body contacts no object, the second wave signal may be formed after the first wave signal is reflected by skin of the user. For example, after a ring that the user wears sends the first wave signal, the first wave signal reaches a fingertip after transmitting through a finger, and the second wave signal is formed after the first wave signal is reflected by skin of the fingertip. The second wave signal is received by the ring after transmitting back. In the case in which the user body contacts an object, the second wave signal may be formed after the first wave signal is reflected by the object. For example, after a ring that the user wears sends the first wave signal, the first wave signal reaches a mouse that the user holds with a hand after transmitting through a finger, and the second wave signal is formed after the first wave signal is reflected by the mouse. The second wave signal is received by the ring after transmitting back. In the foregoing two cases, a signal characteristic of the received second wave signal varies.

The user body may comprise clothes that the user wears, an accessory that the user wears, or the like, such as a glove that the user wears. The object may comprise non-life entities such as a desk, a cup, and a mouse, and may also comprise life entities such as a human body, an animal, and a tree.

The at least a part of the user body may be positions such as the head, the hand, and the leg of the user. In consideration of frequency at which different positions of a human body contact an external object, the at least a part of the user body is more possibly a hand of the user, for example, a palm of the user or a finger of the user. Therefore, the second wave signal is received on a hand of the user, whether the user body (especially the hand) contacts an object is further determined, and the contacted object is identified, which complies with a life habit of the user to a greater extent, and is more natural and efficient.

S160: Judge whether the user body contacts an object according to a signal characteristic of the received second wave signal.

Figure 1B:
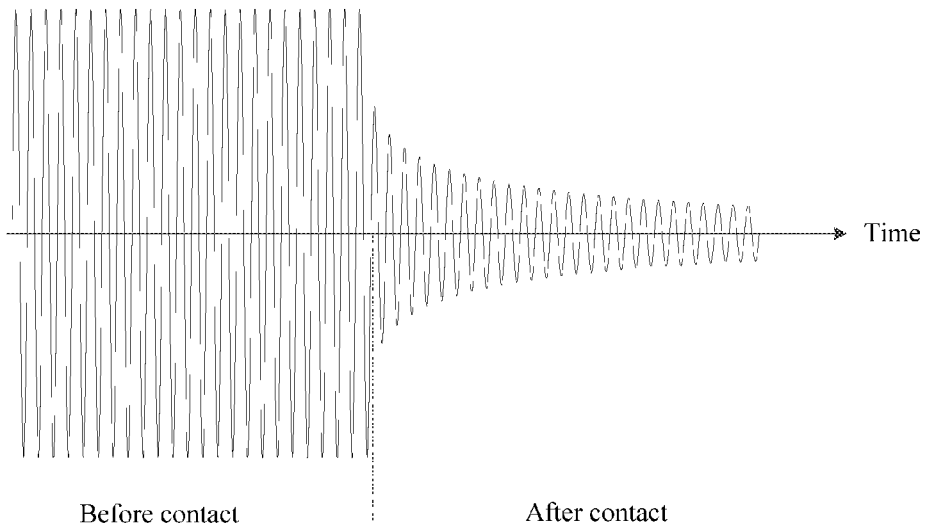
FIG. 1b is an example schematic diagram of a comparison of waveforms, before and after a user body contacts an object, of a second wave signal.

As described above, compared with a signal characteristic of the second wave signal received in the case in which the user body contacts no external object, a signal characteristic of the second wave signal received in the case in which the user body contacts an external object varies. FIG. 1b is a schematic diagram of a comparison of waveforms, before and after a user body contacts a planar object, of a second wave signal. It can be seen that after the user body contacts the planar object, a signal amplitude of the second wave signal obviously decreases. This is because before the user body contacts the planar object, a large part of the first wave signal transmitted through the user body is reflected to form the second wave signal; after the user body contacts the planar object, a part of the first wave signal is conducted and absorbed by the planar object after the first wave signal transmitted through the user body reaches the object, and compared with the case before the contact, less first wave signal is reflected to form the second wave signal. Therefore, in an example embodiment, the signal characteristic of the second wave signal received in the case in which the user body contacts no object may be pre-collected as a reference signal. In step S160, the signal characteristic of the received second wave signal is compared with a characteristic of the reference signal, and whether the user body contacts an object is determined according to a comparison result. For example, in the case in which a degree of similarity between the signal characteristic of the received second wave signal and the characteristic of the reference signal is less than 95%, it is determined that the user body contacts an object.

The contact is not limited to direct contact, and also comprises indirect contact (for example, holding a mouse while wearing a glove) and a case in which a distance between the user body and a corresponding object is less than a preset distance (for example, 0.1 mm).

The signal characteristic of the second wave signal may be related to at least one of an amplitude, a phase, and a frequency spectrum of the second wave signal. Specifically, the signal characteristic of the second wave signal may comprise at least one of a fingerprint, an average value, and a difference, wherein the fingerprint may be formed by at least one of the amplitude, the phase, and the frequency spectrum of the second wave signal; the average value may be an average value of at least one of the amplitude, the phase, and the frequency spectrum of the second wave signal; and the difference may be a difference of at least one of the amplitude, the phase, and the frequency spectrum of the second wave signal.

Figure 2:
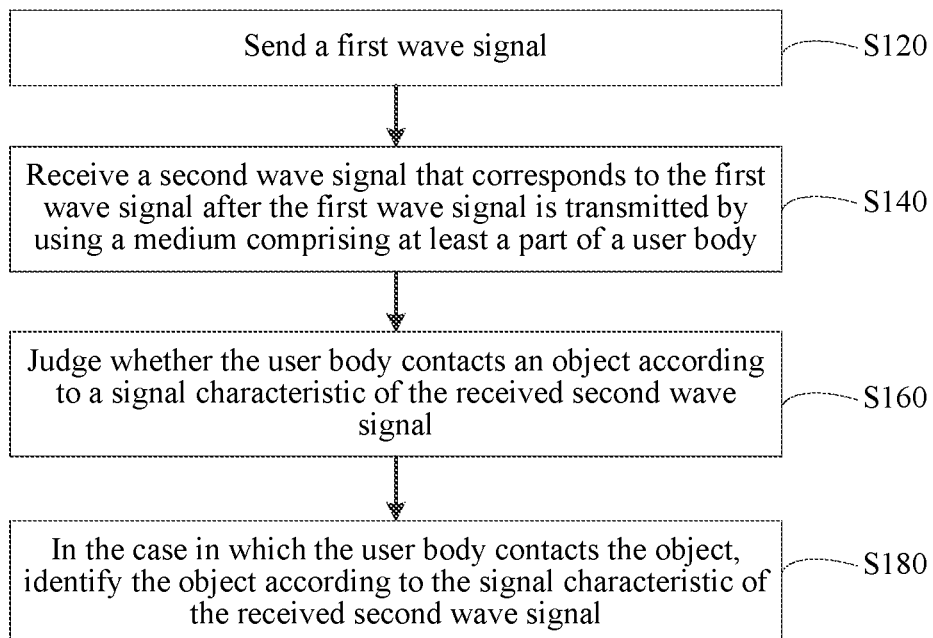
FIG. 2 is an example flowchart of an example embodiment of an interaction method according to an embodiment of the present application.

Referring to FIG. 2, in an example embodiment of the present application, the method may further comprise:

S180: In the case in which the user body contacts the object, identify the object according to the signal characteristic of the received second wave signal.

The inventor finds in researches that affected by a material, a texture, a shape, a size, a type, a structure, and the like that are intrinsic to an object, signal characteristics of wave signals received after the same wave signal is reflected by different objects are obviously different. Therefore, in an example embodiment, the object can be identified according to a signal characteristic, corresponding to a known object, of the second wave signal and the signal characteristic of the received second wave signal. The identifying the object according to a signal characteristic, corresponding to a known object, of the second wave signal and the signal characteristic of the received second wave signal may comprise:

S181: Create a classifier according to the signal characteristic, corresponding to the known object, of the second wave signal.

S182: Perform a classification calculation according to the classifier and the signal characteristic of the received second wave signal, and identify the object according to a calculation result.

The signal characteristic, corresponding to the known object, of the second wave signal may be pre-determined by means of an experiment and pre-stored. For example, a manufacturer or a user pre-holds different objects, and separately records corresponding signal characteristics of the second wave signal, so as to establish a correspondence between a known object and a signal characteristic of the second wave signal, wherein the correspondence may be stored in a storage of a device or a network server, so that the correspondence is invoked in actual use of the method.

The identifying the object may be directly obtaining a name of the object, for example, telling the user that a cup is currently held; and may also be obtaining, by means of identification, attribute information such as a material, a texture, a shape, a size, a structure, and the like of the object, wherein the user can determine what the object is according to the attribute information.

Besides, for a relatively big object, different positions of the object may also correspond to different signal characteristics of the second wave signal; therefore, in step S180, different positions of an object that the user body currently contacts can also be identified according to the signal characteristic of the received second wave signal.

Figure 3:
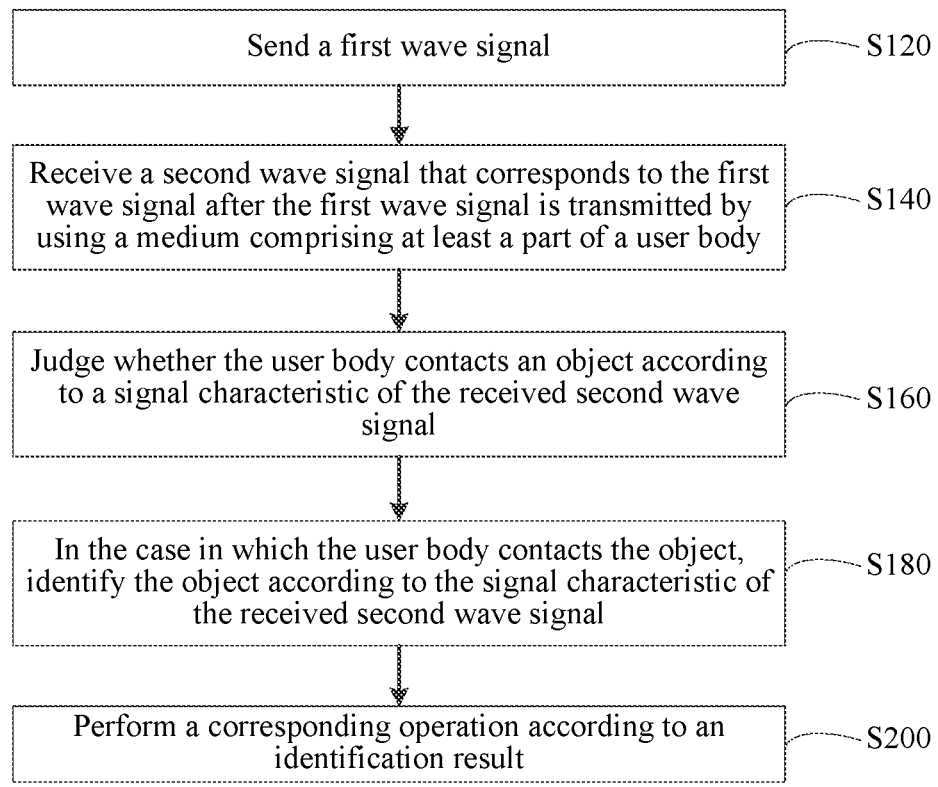
FIG. 3 is an example flowchart of another example embodiment of an interaction method according to an embodiment of the present application.

Referring to FIG. 3, in an example embodiment of the present application, the method may further comprise:

S200: Execute a corresponding operation according to an identification result.

The executing a corresponding operation may comprise switching a mode, inputting content, matching a device, prompting a user, and the like.

For example, in the case in which the identification result indicates that a hand of the user touches a steering wheel, a smart phone of the user may be controlled to switch to a driving mode; in this case, if receiving information, the smart phone may directly broadcast information by using a speech to improve driving safety.

Or, for example, during a game of the user, corresponding control instructions may be input according to identified keys of different shapes that the user contacts.

Or, for example, in the case in which the identification result indicates that a hand of the user contacts a Bluetooth headset, a smart phone of the user can be controlled to automatically match and establish a connection with the Bluetooth headset.

Or, in the case in which it is inconvenient for the user to observe, the user can be prompted according to the identification result. For example, in the case in which a blind user contacts a cup, the blind user may be prompted that a cup is currently contacted, and the user may be further prompted whether the cup has water.

In addition, an embodiment of the present application further provides a computer readable medium, which comprises a computer readable instruction that performs the following operations when being executed: executing operations of step S120, step S140, and step S160 of the method in the example embodiment shown in FIG. 1.

In conclusion, in the method according to this embodiment of the present application, whether a user body contacts an object can be determined according to a signal characteristic of a received second wave signal; in the case in which the user body contacts an object, the object can be further identified; a corresponding operation such as switching a mode, inputting content, matching a device, prompting a user, or the like can be performed according to an identification result. In this way, information interaction between the user and a corresponding device is naturally and efficiently completed.

Figure 4:
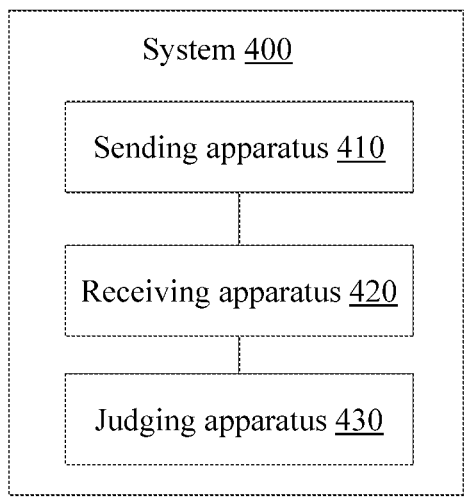
FIG. 4 is an example structural diagram of modules of an interaction system according to an embodiment of the present application.

FIG. 4 is a schematic structural diagram of modules of an interaction system according to an embodiment of the present application, wherein the interaction system may be a wearable device such as a wrist strap or a ring.

As shown in FIG. 4, the interaction system 400 comprises:

a sending apparatus 410, configured to send a first wave signal;

a receiving apparatus 420, configured to receive a second wave signal that corresponds to the first wave signal after the first wave signal is transmitted by using a medium comprising at least a part of a user body; and a judging apparatus 430, configured to judge whether the user body contacts an object according to a signal characteristic of the received second wave signal.

In the system according to this embodiment of the present application, the first wave signal is sent; the second wave signal that corresponds to the first wave signal after the first wave signal is transmitted by using the medium comprising at least a part of the user body is received, wherein depending on whether the user body contacts an object, a signal characteristic of the second wave signal is different; and consequently whether the user body contacts the object can be naturally and efficiently determined according to the signal characteristic of the received second wave signal.

In an example embodiment, the sending apparatus 410 may periodically send the first wave signal, for example, send the first wave signal each second.

In another example embodiment, the sending apparatus 410 may send the first wave signal as triggered by a user, for example, send the first wave signal in response to pressing, by the user, a key.

The second wave signal may be formed after the first wave signal is reflected. In the case in which the user body contacts no object, the second wave signal may be formed after the first wave signal is reflected by skin of the user. For example, after a ring that the user wears sends the first wave signal, the first wave signal reaches a fingertip after transmitting through a finger, and the second wave signal is formed after the first wave signal is reflected by skin of the fingertip. The second wave signal is received by the ring after transmitting back. In the case in which the user body contacts an object, the second wave signal may be formed after the first wave signal is reflected by the object. For example, after a ring that the user wears sends the first wave signal, the first wave signal reaches a mouse that the user holds with a hand after transmitting through a finger, and the second wave signal is formed after the first wave signal is reflected by the mouse. The second wave signal is received by the ring after transmitting back. In the foregoing two cases, a signal characteristic of the received second wave signal varies.

The user body may comprise clothes that the user wears, an accessory that the user wears such as a glove that the user wears, or the like. The object may comprise non-life entities such as a desk, a cup, and a mouse, and may also comprise life entities such as a human body, an animal, and a tree.

The at least a part of the user body, that is, a position related to a position in which the interaction system is worn, may be positions such as the head, the hand, and the leg of the user. In consideration of frequency at which different positions of a human body contact an external object, an interaction process is more natural and efficient when the interaction system is worn on the hand of the user, for example, the interaction system is worn in a position such as a wrist of the user or a finger of the user. Besides, to improve determining accuracy of the interaction system, a material such as silica gel or another flexible material that facilitates wave signal transmission may be provided between the interaction system and the user body.

As described above, compared with a signal characteristic of the second wave signal received in the case in which the user body contacts no external object, a signal characteristic of the second wave signal received in the case in which the user body contacts an external object varies. Therefore, in an example embodiment, the signal characteristic of the second wave signal received in the case in which the user body contacts no object may be pre-collected as a reference signal. The judging apparatus 430 may compare the signal characteristic of the received second wave signal with a reference signal characteristic, and judge whether the user body contacts an object according to a comparison result. For example, in the case in which a degree of similarity between the signal characteristic of the received second wave signal and the reference signal characteristic is less than 95%, it is determined that the user body contacts an object.

The contact is not limited to direct contact, and also comprises indirect contact (for example, holding a mouse while wearing a glove) and a case in which a distance between the user body and a corresponding object is less than a preset distance (for example, 0.1 mm).

The signal characteristic of the second wave signal may be related to at least one of an amplitude, a phase, and a frequency spectrum of the second wave signal. Specifically, the signal characteristic of the second wave signal may comprise at least one of a fingerprint, an average value, and a difference, wherein the fingerprint may be formed by at least one of the amplitude, the phase, and the frequency spectrum of the second wave signal; the average value may be an average value of at least one of the amplitude, the phase, and the frequency spectrum of the second wave signal; and the difference may be a difference of at least one of the amplitude, the phase, and the frequency spectrum of the second wave signal.

Figure 5:
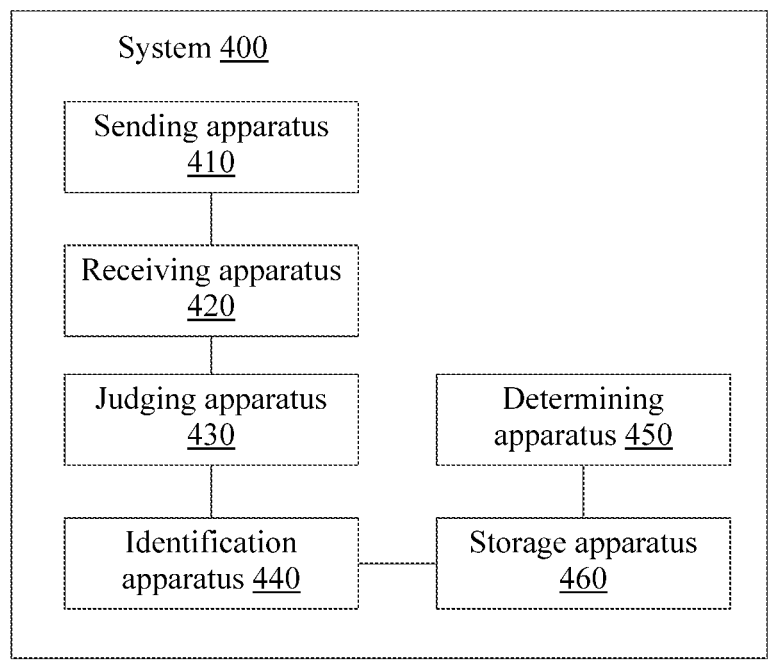
FIG. 5 is an example structural diagram of modules in an example embodiment of an interaction system according to an embodiment of the present application.

Referring to FIG. 5, in an example embodiment of the present application, the interaction system further comprises:
    an identification apparatus 440, configured to: in the case in which the user body contacts the object, identify the object according to the signal characteristic of the received second wave signal.

It is noted that effects by a material, a texture, a shape, a size, a type, a structure, or the like of an object, and signal characteristics of wave signals received after the same wave signal is reflected by different objects are obviously different. Therefore, in an example embodiment, the identification apparatus 440 can identify the object according to a signal characteristic, corresponding to a known object, of the second wave signal and the signal characteristic of the received second wave signal.

The signal characteristic, corresponding to the known object, of the second wave signal may be pre-determined by means of an experiment and pre-stored. For example, a manufacturer or a user pre-holds different objects, and separately records corresponding signal characteristics of the second wave signal, so as to establish a correspondence between a known object and a signal characteristic of the second wave signal, wherein the correspondence may be stored in a device storage or a network server, so that the correspondence is invoked in actual use of the method. Correspondingly, referring to FIG. 5, the interaction system 400 may further comprise:
    a determining apparatus 450, configured to pre-determine the signal characteristic, corresponding to the known object, of the second wave signal; and
    a storage apparatus 460, configured to pre-store the signal characteristic, corresponding to the known object, of the second wave signal.

The identifying the object may be directly obtaining a name of the object, for example, telling the user that a cup is currently held; and may also be obtaining, by means of identification, attribute information such as a material, a texture, a shape, a size, a structure, and the like of the object, wherein the user can determine what the object specifically is according to the attribute information.

Besides, for a relatively big object, different positions of the object may also correspond to different signal characteristics of the second wave signal; therefore, the identifying the object may also be identifying, according to the signal characteristic of the received second wave signal, different positions of an object that the user body currently contacts.

Figure 6:
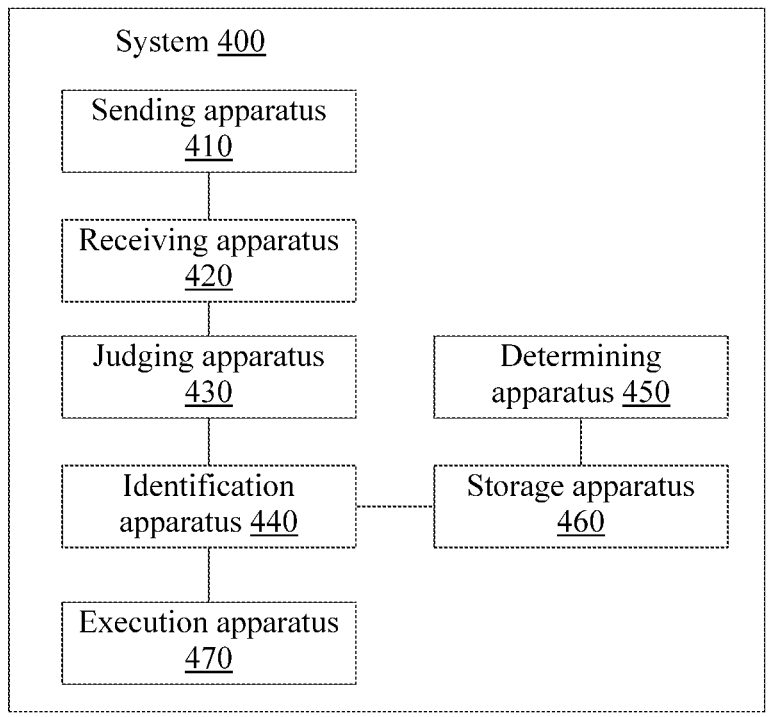
FIG. 6 is an example structural diagram of modules in another example embodiment of an interaction system according to an embodiment of the present application.

Referring to FIG. 6, in an example embodiment of the present application, the system 400 may further comprise:
    an execution apparatus 470, configured to execute a corresponding operation according to an identification result.

The executing a corresponding operation may comprise switching a mode, inputting content, matching a device, prompting a user, and the like.

In conclusion, in the system according to this embodiment of the present application, whether a user body contacts an object can be determined according to a signal characteristic of a received second wave signal; in the case in which the user body contacts an object, the object can be further identified; a corresponding operation such as switching a mode, inputting content, matching a device, prompting a user, or the like can be performed according to an identification result. In this way, information interaction between the user and a corresponding device is naturally and efficiently completed.

Figure 7:
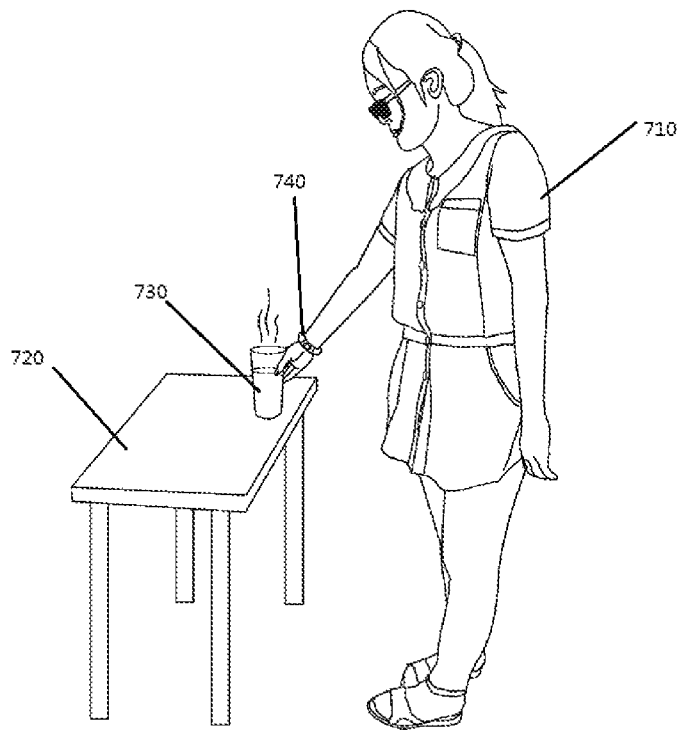
FIG. 7 is an example schematic diagram of an application scenario of an interaction system according to an embodiment of the present application.

FIG. 7 is a schematic diagram of an application scenario of an interaction system according to an embodiment of the present application. As shown in FIG. 7, a user 710 is a blind person, and wants to find a cup 730 on a table 720 to drink water. When a finger of the user 710 contacts the table 720, a wrist strap 740 worn on a wrist of the user 710 determines that the body of the user 710 contacts an object, further identifies that the object is the table 720, and prompts, by using a speech, the user that the table 720 is currently contacted. Then, the user 710 continues to grope on the table 720; when a finger of the user 710 contacts the cup 730, the wrist strap 740 determines that the body of the user 710 contacts a new object, further identifies that the new object is the cup 730, and prompts, by using a speech, the user that the cup is currently contacted. Further, the wrist strap 740 can further identify and prompt, by using a speech, the user 710 that the cup 730 has water, so that the user conveniently drinks.

Figure 8:
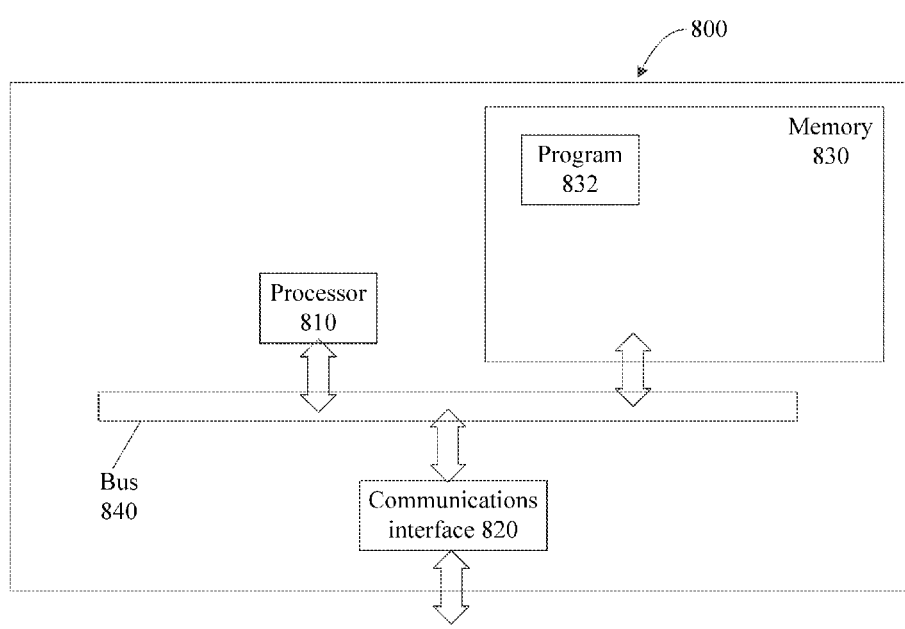
FIG. 8 is an example structural diagram of hardware of an interaction system according to an embodiment of the present application.

A hardware structure of an interaction system according to an embodiment of the present application is shown in FIG. 8. A specific embodiment of the present application is not intended to limit a specific implementation of the interaction system. Referring to FIG. 8, the interaction system 800 may comprise:

a processor 810, a communications interface 820, a memory 830, and a communications bus 840.

The processor 810, the communications interface 820, and the memory 830 complete communication with each other by using the communications bus 840.

The communications interface 820 is configured to communicate with another network element.

The processor 810 is configured to execute a program 832, and specifically can execute related steps in the method embodiments shown in FIG. 1 to FIG. 3.

Specifically, the program 832 may comprise program code, and the program code comprises a computer operation instruction.

The processor 810 may be a central processing unit (CPU), an application specific integrated circuit (ASIC), or one or more integrated circuits configured to implement the embodiments of the present application.

The memory 830 is configured to store the program 832. The memory 830 may comprise a high-speed RAM memory, and may also comprise a non-volatile memory, for example, at least one magnetic disk memory. The program 832 can specifically perform the following steps:

sending a first wave signal;
receiving a second wave signal that corresponds to the first wave signal after the first wave signal is transmitted by using a medium comprising at least a part of a user body; and
judging whether the user body contacts an object according to a signal characteristic of the received second wave signal.

For specific implementations of steps in the program 832, reference may be made to related steps or modules in the foregoing embodiments, which are not described herein again. It may be clearly understood by a person skilled in the art that, for the purpose of a convenient and brief description, for specific working processes of the foregoing devices and modules, reference may be made to corresponding process descriptions in the foregoing method embodiments, which are not described herein again.

A person of ordinary skill in the art may be aware that, the exemplary units and method steps described in the embodiments disclosed in this specification may be implemented by electronic hardware, or a combination of computer software and the electronic hardware. Whether the functions are performed in a hardware manner or a software manner depends on particular applications and design constraint conditions of the technical solutions. A person skilled in the art may use different methods to implement the described functions for each particular application, but the implementation shall not be construed as exceeding the scope of the present application.

When the functions are implemented in a form of a software functional unit, and are sold or used as an independent product, the functions may be stored in a computer readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or a part of the steps of the method described in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing example embodiments are only for the purpose of describing the present application, and are not intended to limit the present application. A person of ordinary skill in the art may make various changes and variations without departing from the spirit and scope of the present application; therefore, any equivalent technical solution falls within the scope of the present application, and the patent protection scope of the present application shall be defined by claims.

What is claimed is:

1. A method, comprising:
   sending, by a system comprising a processor, a first wave signal;
   receiving, by the system, a second wave signal that corresponds to the first wave signal after the first wave signal is transmitted using a medium comprising at least a part of a user body; and
   determining, by the system, whether the user body contacts an object based on a comparison of a signal characteristic of the second wave signal and a reference signal characteristic.

2. The method of claim 1, wherein the second wave signal is formed after the first wave signal is reflected.

3. The method of claim 1, wherein at least the part of the user body comprises a hand.

4. The method of claim 1, wherein the reference signal characteristic is representative of the signal characteristic of the second wave signal in a case in which the user body is determined not to be contacting the object.

5. The method of claim 1, further comprising:
   in a case in which the user body is determined to be contacting the object, identifying, by the system, the object according to the signal characteristic of the second wave signal.

6. The method of claim 5, wherein the identifying the object according to the signal characteristic of the second wave signal comprises:
   identifying the object according to a known signal characteristic, corresponding to a known object, of the second wave signal and the signal characteristic of the second wave signal.

7. The method of claim 6, further comprising:
   pre-storing, by the system, the known signal characteristic, corresponding to the known object, of the second wave signal.

8. The method of claim 6, further comprising:
   pre-determining, by the system, the known signal characteristic, corresponding to the known object, of the second wave signal.

9. The method of claim 5, further comprising:
   executing, by the system, a corresponding operation based on the identification of the object.

10. The method of claim 9, wherein the executing the corresponding operation comprises at least one of switching a mode, inputting content, matching a device, or prompting a user.

11. The method of claim 5, wherein the identifying the object comprises at least one of identifying a material of the object, identifying a texture of the object, identifying a shape of the object, identifying a size of the object, identifying a type of the object, identifying a structure of the object, or identifying a contact position of the object.

12. The method of claim 1, wherein the signal characteristic of the second wave signal is related to at least one of an amplitude, a phase, or a frequency spectrum of the second wave signal.

13. The method of claim 12, wherein the signal characteristic of the second wave signal comprises at least one of a fingerprint, an average value, or a difference, wherein the fingerprint is formed by at least one of the amplitude, the phase, or the frequency spectrum of the second wave signal;

the average value is an average value of at least one of the amplitude, the phase, or the frequency spectrum of the second wave signal; and the difference is a difference of at least one of the amplitude, the phase, or the frequency spectrum of the second wave signal.

14. The method of claim 1, wherein the first wave signal and the second wave signal are each an acoustic wave signal.

15. The method of claim 1, wherein the first wave signal and the second wave signal are each an ultrasonic wave signal.

16. The method of claim 1, wherein the first wave signal and the second wave signal are each an electromagnetic wave signal.

17. A system, comprising:

a sending apparatus configured to send a first wave signal;

a receiving apparatus configured to receive a second wave signal that corresponds to the first wave signal after the first wave signal is transmitted using a medium comprising at least a part of a user body; and a judging apparatus configured to judge whether the user body contacts an object based on a comparison of a signal characteristic of the second wave signal and a reference signal characteristic.

18. The system of claim 17, further comprising:

an identification apparatus configured to: in a case in which the user body contacts the object, identify the object according to the signal characteristic of the second wave signal.

19. The system of claim 18, wherein the identification apparatus is configured to: in the case in which the user body contacts the object, identify the object according to a known signal characteristic, corresponding to a known object, of the second wave signal and the signal characteristic of the second wave signal.

20. The system of claim 19, further comprising:

a storage apparatus configured to pre-store the known signal characteristic, corresponding to the known object, of the second wave signal.

21. The system of claim 19, further comprising:

a determining apparatus configured to pre-determine the known signal characteristic, corresponding to the known object, of the second wave signal.

22. The system of claim 17, further comprising:

an execution apparatus configured to execute a corresponding operation based on the identification of the object.

23. The system of claim 17, further comprising at least one of a wrist strap or a ring that sends the first wave signal.

24. A computer readable storage device, comprising at least one executable instruction, which, in response to execution, causes an interaction device comprising a processor to perform operations, comprising:

sending a first wave signal;

receiving a second wave signal that corresponds to the first wave signal after the first wave signal is transmitted using a medium comprising at least a part of a user body; and determining whether the user body contacts an object based on a comparison of a signal characteristic of the second wave signal and a reference signal characteristic.

25. The computer readable storage device of claim 24, the operations further comprising:

in a case in which the user body is determined to be contacting the object, identifying the object according to the signal characteristic of the second wave signal.

26. An interaction device, comprising a processor and a memory, the memory storing executable instructions, the processor being connected to the memory through a communication bus, and when the interaction device operates, the processor executes the executable instructions stored in the memory, so that the interaction device executes operations, comprising:

sending a first wave signal;

receiving a second wave signal that corresponds to the first wave signal after the first wave signal is transmitted using a transmission medium comprising at least a part of a user body; and determining whether the user body contacts an object based on a comparison of a signal characteristic of the second wave signal and a reference signal characteristic.

27. The interaction device of claim 26, the operations further comprising:

in a case in which the user body is determined to be contacting the object, identifying the object according to the signal characteristic of the second wave signal.

* * * * *